United States Patent
Wernli

[15] 3,704,731
[45] Dec. 5, 1972

[54] WARPBEAM BRAKE DEVICE
[72] Inventor: Karl Wernli, Rothrist, Switzerland
[73] Assignee: Wernli AG Verbandstaff-Fabrik-Weberei, Rothrist, Switzerland
[22] Filed: Feb. 26, 1971
[21] Appl. No.: 119,304

[30] Foreign Application Priority Data
March 2, 1970 Switzerland..........................3006/70

[52] U.S. Cl..................................................139/109
[51] Int. Cl............................D03d 49/08, D03d 49/10
[58] Field of Search........139/100, 109, 110; 66/86 A; 242/75.43

[56] References Cited
UNITED STATES PATENTS

| | | | |
|---|---|---|---|
| 2,271,202 | 1/1942 | Moessinger | 139/109 |
| 2,397,914 | 4/1946 | Blouin | 139/109 |
| 2,696,094 | 12/1954 | Schwanda et al. | 139/109 X |
| 2,441,680 | 5/1948 | Wakefield | 139/109 |
| 2,755,822 | 7/1956 | Hunt | 139/109 |
| 3,470,921 | 10/1969 | Booth | 139/109 |
| 3,366,147 | 1/1968 | Picanol | 139/100 |

FOREIGN PATENTS OR APPLICATIONS

| | | | |
|---|---|---|---|
| 822,601 | 10/1959 | Great Britain | 139/100 |
| 199,411 | 11/1938 | Switzerland | 139/100 |

*Primary Examiner*—James Kee Chi
*Attorney*—Michael S. Striker

[57] ABSTRACT

At normal warp thread tension, a transmission gear turned by the warpbeam, rotates a brake disc which is in contact with a brake surface due to the action of a spring. When the warp thread tension increases, the transmission gear turns a carrier, on which the brake disc is mounted, so that the brake disc moves away from the brake surface against the action of the spring so that the warp thread tension is reduced, and the carrier with the brake disc is moved by the spring to press the brake disc against the brake surface.

10 Claims, 1 Drawing Figure

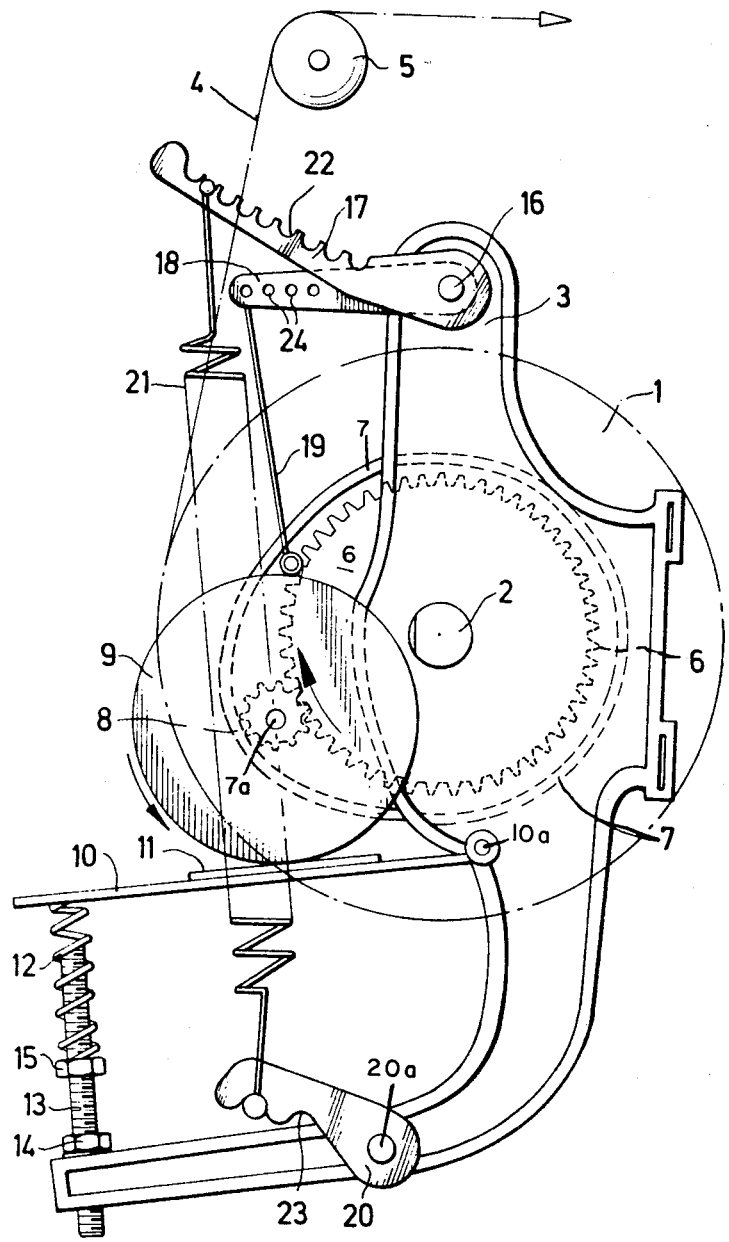

WARPBEAM BRAKE DEVICE

BACKGROUND OF THE INVENTION

The present invention is concerned with the problem of braking a warpbeam to a different degree, depending on the warp thread tension.

It is one object of the invention to provide a warpbeam brake device which can be attached to any existent loom.

Another object of the invention is to provide a warpbeam brake device which reduces the warp thread tension when the same becomes unduly high so that the warp threads are uniformly tensioned.

Another object of the invention is to provide a warpbeam brake device which is particularly suited for looms operating at high speed.

Another object of the invention is to provide a warpbeam brake device which permits easy handling of tied warp thread by unskilled workers at the warp beam.

Another object of the invention is to provide a warpbeam brake device which automatically adjusts the warp thread tension.

With the above objects in view, the present invention comprises transmission means including a transmission gear connected with a warpbeam for rotation and being mounted on supporting means for rotation about an axis; a carrier mounted for rotation about the axis and having a pivot means; a rotary control gear mounted on the pivot means and meshing with the transmission gear; a rotary brake member mounted on the pivot means and connected with the control gear for rotation; a brake surface in contact with the brake member; and linkage means including spring means and connecting the carrier with the supporting means.

The control gear meshes with a portion of the transmission gear moving during rotation of the warp beam in a direction away from the brake surface. The spring means normally urge the carrier with the brake member against the brake surface so that rotation of the brake member, control gear, transmission gear, and warp beam is braked.

At high tension of the warp threads, the transmission gear acts through the control gear and pivot means to urge the carrier with the brake member to turn in one direction against the action of the spring means about the axis of the transmission gear and away from the brake surface, so that the friction between the brake surface and the tension of the warp threads are reduced, permitting the spring means to turn the carrier in an opposite direction for pressing the brake member against the brake surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic side elevation illustrating an embodiment of the invention.

DESCRIPTION OF THE PREFERRED EMBODIMENT

The shaft of a warpbeam 1 is operatively connected with a transmission shaft 2 which is mounted in bearings of an outer housing 3, which constitutes supporting means for the device. The housing 3 can be fixedly connected with the frame of a loom in which the warpbeam 1 is provided, but can also be mounted on an independent fixed support rearward of the loom.

The warp threads 4, which are wound up on the warpbeam 1, are guided over a roller 5, and pulled off the warpbeam 1 in the direction of the arrow.

A transmission gear 6 is fixedly secured to shaft 2. A carrier in the form of an inner housing 7 is mounted on transmission shaft 2 for free rotation. On a portion of carrier 7, a pivot means 7a is mounted outside of transmission gear 6, and a control gear or pinion 8 is mounted on pivot 7a, meshing with transmission gear 6. A brake member or brake disc 9 of circular shape is also mounted on pivot 7a and secured to control gear 8 for rotation wit the same.

The inner housing or carrier 7 envelopes the transmission gear 6, the control gear 8, and part of the brake disc 9, and part of the inner carrier housing 7 is located within the outer housing and supporting means 3. A lever 10 is pivotally mounted on a pivot 10a of the outer housing and supporting means 3, and has on top a brake lining 11. A threaded bolt 13, secured to one end portion of housing 3, is secured by a nut 14, and carries an adjusting nut 15 acting on a coil spring 12 partly surrounding bolt 13 so that by adjustment of nut 15, the resilient pressured exerted by spring 12 on the outer end of lever 10 can be adjusted. In this manner, the pressure between the peripheral surface of brake disc 9 and the brake surface 11, 10, can be adjusted. Due to the fact that a free end of spring 12 abuts lever 10, the same resists resiliently the pressure exerted by brake disc 9 on brake surface 11.

The outer housing and supporting means 3 has another end portion on which a pivot 16 is rotatably mounted. An angular lever is formed by pivot 16 and two lever arms 17 and 18. Lever arm 18 is pivotally connected with a link 19 whose other end is pivotally connected to the inner carrier housing 7 at a point radially spaced from the axis of shaft 2 about which carrier housing 7 turns with pivot 7a, control gear 8, and brake disc 9.

The lower arm of the supporting housing 3 carries a holder 20 with two recesses 23 into which the lower end of a coil spring 21 can be selectively inserted. Holder 20 is pivotally supported by a pivot 20a on the lower housing end portion of supporting housing means 3.

Lever arm 17 has a plurality of attaching recesses 22, into which the upper end of spring 21 can be selectively inserted for varying the effective lever arm of lever 17 at which the force of spring 21 acts.

In the illustrated embodiment, the lever arm 18 has a plurality of radially spaced bores 24 into which the hooked end of link 19 can be selectively inserted for varying the effective lever arm of lever 18.

By selection of a suitable attaching recess 22 into which the end of spring 21 is inserted, and of one of the bores 24 into which the link 19 is inserted, together with the selection of a recess 23 in holder 20, adjustments can be carried out which modify the effect of the linkage 21, 17, 16, 18, 19 on the inner carrier housing 7, in which the brake disc 9 is mounted for rotation.

Evidently, the effective lever arms at which spring 21 and link 19 act, could be adjusted in a different manner. In accordance with the actual length of the effective lever arms, the force exerted by spring 21 on the inner carrier housing 7, can be adjusted.

When the warp threads 4 are pulled off the warpbeam 1, they are tensioned and cause rotation of warpbeam 1 with shaft 2 so that transmission gear 6 is turned in the direction of the arrow. The spring 21 presses through the linkage 17, 18, 19 against the inner carrier housing 7 at a point radially spaced from the axis of shaft 2, so that carrier housing 7 turns in counterclockwise direction, as indicated by an arrow, and brake disc 9 abuts brake lining surface 11 so that brake disc 9, and thereby transmission gear 6, transmission shaft 2, and warpbeam 1 are braked, while brake disc 9 is rotated by transmission gear 6 and control gear 8.

When the tension in the warp threads 4 exceeds the force exerted by spring 21, transmission gear 6 cannot turn control gear 8 with brake disc 9, and control gear 8 is moved by transmission gear 6 along the periphery thereof. Since control gear 8 meshes with a portion of transmission gear 6 which moves away from the brake surface 11, pivot 7a, control gear 8, and brake disc 9 move away from the brake surface 11 while carrier housing 7 turns about shaft 2 so that the brake friction is reduced, until the force of spring 21 urges the carrier housing 7 with brake disc 9 with greater pressure against brake surface 11.

This may again cause braking of the warp beam by the rotating elements 9, 8, 6, 2 until the higher tension of the warp threads 4 again lifts brake disc 9 off brake surface 11.

As long as warp threads 4 are pulled off the warpbeam 1, the inner carrier housing 7 performs a continuous uniform tension equalizing vibration during which the pressure of the brake disc 9 against the brake surface 11 is continuously varied to obtain a uniform feeding of warp threads 4 from warpbeam 1.

By adjusting link 19 in the bores 24 of lever 18, the tension of spring 21 can be increased or reduced. If spring 21 is attached to an attaching recess 22 which is closer to the axis of pivot 16, the force exerted by spring 21 is reduced, so that the warp thread tension can be maintained at a constant level, while the diameter of the warp thread package on warpbeam 1 is continuously reduced.

It is also possible to adapt the tension of spring 21 to the varying diameter of the warp thread package on warpbeam 1, by a feeler sensing the diameter of the warp thread wound on warpbeam 1. In such a construction, lever 17 is formed as a rack bar with rack teeth on top, meshing with a gear piston to which spring 21 is secured. The displacement of the gear piston along the rack of lever 17, not shown, is effected by a linkage transmitting the movement of the feeler.

It will be understood that each of the elements described above, or two or more together, may also find a useful application in other types of warpbeam brake devices differing from the types described above.

While the invention has been illustrated and described as embodied in a warpbeam brake device for automatically varying the brake pressure between a rotary brake member driven from the warpbeam, and a brake surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, form the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

The following is claimed:

1. Warpbeam brake device comprising a rotary warpbeam having wound up warp threads so that said warpbeam turns when said warp threads are pulled off; supporting means; transmission means including a transmission gear connected with said warpbeam for rotation and being mounted on said supporting means for rotation in one direction about an axis; a carrier mounted for rotation about said axis and having pivot means radially spaced from said axis; a rotary control gear mounted on said pivot means and meshing with said transmission gear; a rotary brake member mounted on said pivot means and connection with said control gear for rotation; brake means mounted on said supporting means and having a brake surface in contact with said brake member; and linkage means connecting said carrier with said supporting means, and including spring means for urging said carrier with said brake member against said brake surface so that rotation of said brake member, control gear, transmission gear, and warpbeam in said one direction is braked; said control gear meshing with a portion of said transmission gear moving during rotation of said warpbeam in said one direction away from said brake surface whereby at high tension of said warp threads, said transmission gear acts through said control gear and pivot means to urge said carrier with said brake member to turn in said one direction against the action of said spring means about said axis away from said brake surface so that the friction between said brake member and said brake surface, and thereby the tension of said warp threads are reduced, permitting said spring means to turn said carrier in a direction opposite to said one direction for pressing said brake member against said brake surface.

2. A device as claimed in claim 1 wherein said brake means include a lever means mounted at one end thereof on said supporting means for angular movement about an axis parallel to said axis, said lever means having said brake surface, and adjusting means mounted on said supporting means and engaging the other end of said lever means for turning the same to adjusted positions in which said brake surface cooperates with said brake member.

3. A device as claimed in claim 2 wherein said adjusting means includes a spring resiliently supporting said other end of said lever means.

4. A device as claimed in claim 1 wherein said supporting means has first and second spaced supporting portions; wherein said spring means is mounted at one end thereof on said first supporting portion; wherein said linkage means includes a linkage connecting the other end of said spring means with said carrier spaced from said axis; and wherein said linkage is mounted on said second supporting portion for angular movement.

5. A device as claimed in claim 4 wherein said linkage includes means for adjusting the length of said linkage between said other end of said spring means and said carrier.

6. A device as claimed in claim 1 wherein said transmission means include a transmission shaft connected with said warpbeam for rotation and fixedly carrying said transmission gear; wherein said supporting means supports said transmission shaft for rotation; and wherein said carrier is mounted on said transmission shaft for rotation about said axis and has a carrier end portion radially projecting from said transmission gear and carrying said pivot means, control gear, and brake member.

7. A device as claimed in claim 1 wherein said supporting means includes first and second support end portions; wherein one end of said spring means is mounted on said first support end portion; and wherein said linkage means include a pivot on said second support end portion, lever means mounted on said pivot and mounting the other end of said spring means, and a link pivotally connected with said lever means, and also with said carrier means at a point radially spaced from said axis whereby said spring means urge said carrier to turn about said axis opposite to said one direction.

8. A device as claimed in claim 7 wherein said lever means is angular and includes first and second lever arms; wherein said first lever arm has a plurality of attaching portions for securing said other end of said spring means in positions spaced different radial distances from said pivot on said second support end portion; and wherein said second lever arm has a plurality of attaching portions for securing said link in positions spaced different radial distances from said pivot on said second support portion.

9. A device as claimed in claim 1 wherein said supporting means includes first and second support end portions; wherein one end of said spring means is mounted on said first support end portion; and wherein said linkage means include a pivot on said second support end portion, lever means mounted on said pivot and mounting the other end of said spring means, and a link pivotally connected with said lever means, and also with said carrier means at a point radially spaced from said axis whereby said spring means urge said carrier to turn about said axis opposite to said one direction; wherein said transmission means include a transmission shaft connected with said warp beam for rotation and fixedly carrying said transmission gear; wherein said supporting means has a central portion supporting said transmission shaft for rotation; and wherein said carrier is mounted on said transmission shaft for rotation about said axis and has a carrier end portion radially projecting from said transmission gear and carrying said pivot means, control gear, and brake member.

10. A device as claimed in claim 1 wherein said supporting means includes a stationary fixed housing having bearing means; and wherein said transmission means include a transmission shaft fixedly carrying said transmission gear and being mounted in said bearing means for rotation about said axis; and wherein said carrier is partly located in said fixed housing and envelopes said control gear, said transmission gear, and part of said brake member, said carrier being rotatably mounted on said transmission shaft.

* * * * *